(12) United States Patent
Lin

(10) Patent No.: US 8,333,160 B2
(45) Date of Patent: Dec. 18, 2012

(54) DETACHABLE TOOL CART

(76) Inventor: Yun-Huei Lin, Taichung (TW)

( * ) Notice: Subject to any disclaimer, the term of this patent is extended or adjusted under 35 U.S.C. 154(b) by 158 days.

(21) Appl. No.: 12/881,172

(22) Filed: Sep. 14, 2010

(65) Prior Publication Data

US 2012/0061930 A1 Mar. 15, 2012

(51) Int. Cl.
*A47B 9/00* (2006.01)

(52) U.S. Cl. ...................... 108/147.13; 108/25

(58) Field of Classification Search .......... 108/25, 108/26, 33, 34, 38, 115, 106, 107, 110, 166, 108/171, 172, 147.11, 147.12, 147.13, 147.14, 108/147.15, 147.17, 147.18; 211/41.11, 211/150, 134, 153
See application file for complete search history.

(56) References Cited

U.S. PATENT DOCUMENTS

| | | | | |
|---|---|---|---|---|
| 4,501,369 A | * | 2/1985 | Fox | 108/147.12 |
| 4,595,107 A | * | 6/1986 | Welsch | 108/147.13 |
| 4,763,799 A | * | 8/1988 | Cohn et al. | 108/147.13 |
| 5,438,938 A | * | 8/1995 | Meeker et al. | 108/91 |
| 5,676,263 A | * | 10/1997 | Chang | 108/147.13 |
| D426,043 S | * | 5/2000 | Lu | D34/21 |
| 6,604,473 B2 | * | 8/2003 | Felsenthal | 108/147.13 |
| 6,669,214 B1 | * | 12/2003 | Domis | 280/47.35 |
| 6,752,278 B2 | * | 6/2004 | Craft et al. | 211/85.7 |
| 6,796,565 B2 | * | 9/2004 | Choi et al. | 211/194 |
| D608,071 S | * | 1/2010 | Presnell | D34/21 |
| 7,950,337 B2 | * | 5/2011 | Chen | 108/115 |
| D640,436 S | * | 6/2011 | Perelli et al. | D34/17 |
| 2011/0042334 A1 | * | 2/2011 | Sucevich et al. | 211/71.01 |

\* cited by examiner

*Primary Examiner* — Jose V Chen

(57) ABSTRACT

Disclosed is a detachable tool cart comprising a main frame, at least a toolbox and at least a handle. The main frame includes poles standing in parallel and wire plates. Each pole has a wheel, and each wire plate has rings designated around to be locked upon corresponding poles. A position assembly is applied to fix a ring on the pole and, therefore, the poles and the wire plates construct a layered main frame. The toolbox includes two polygonal box members which are able to be placed on the wire plate with trays for placing tools or parts. The handle has two sleeves to clasp onto corresponding poles.

6 Claims, 18 Drawing Sheets

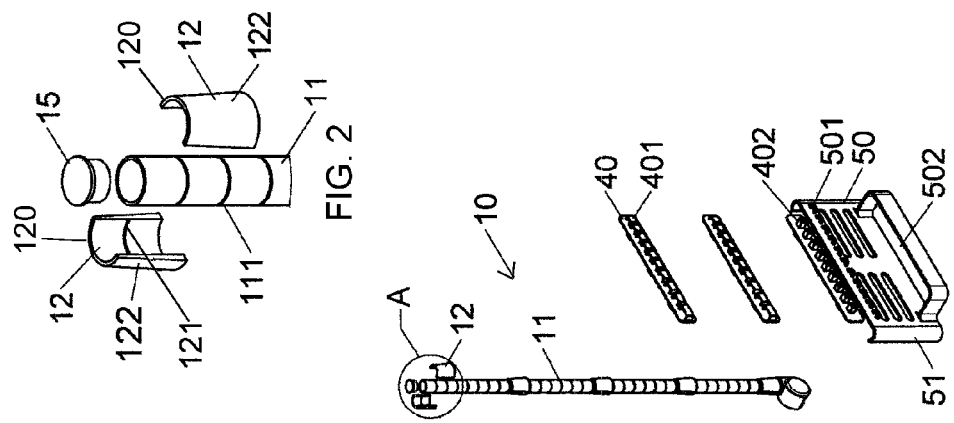
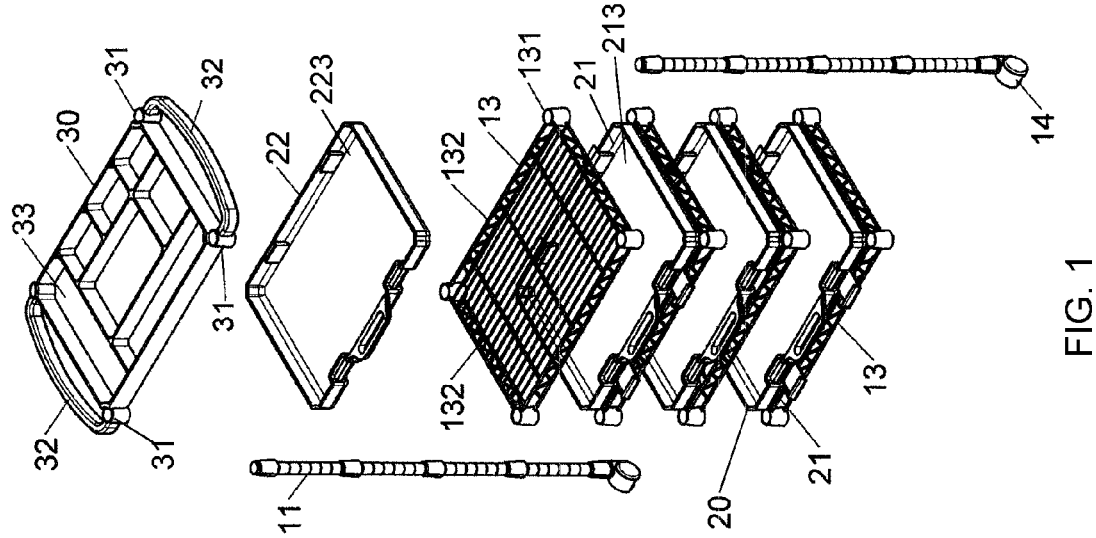
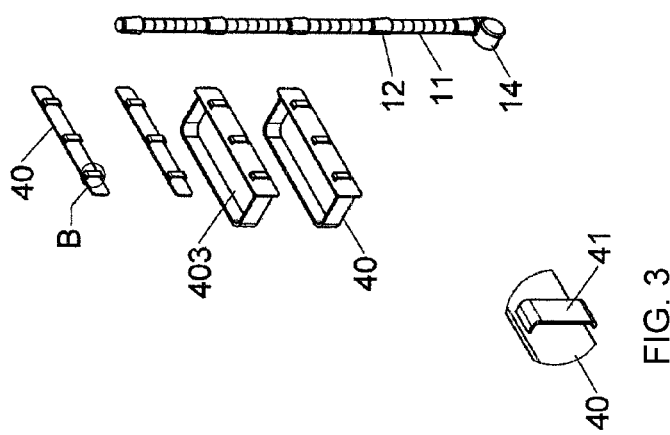

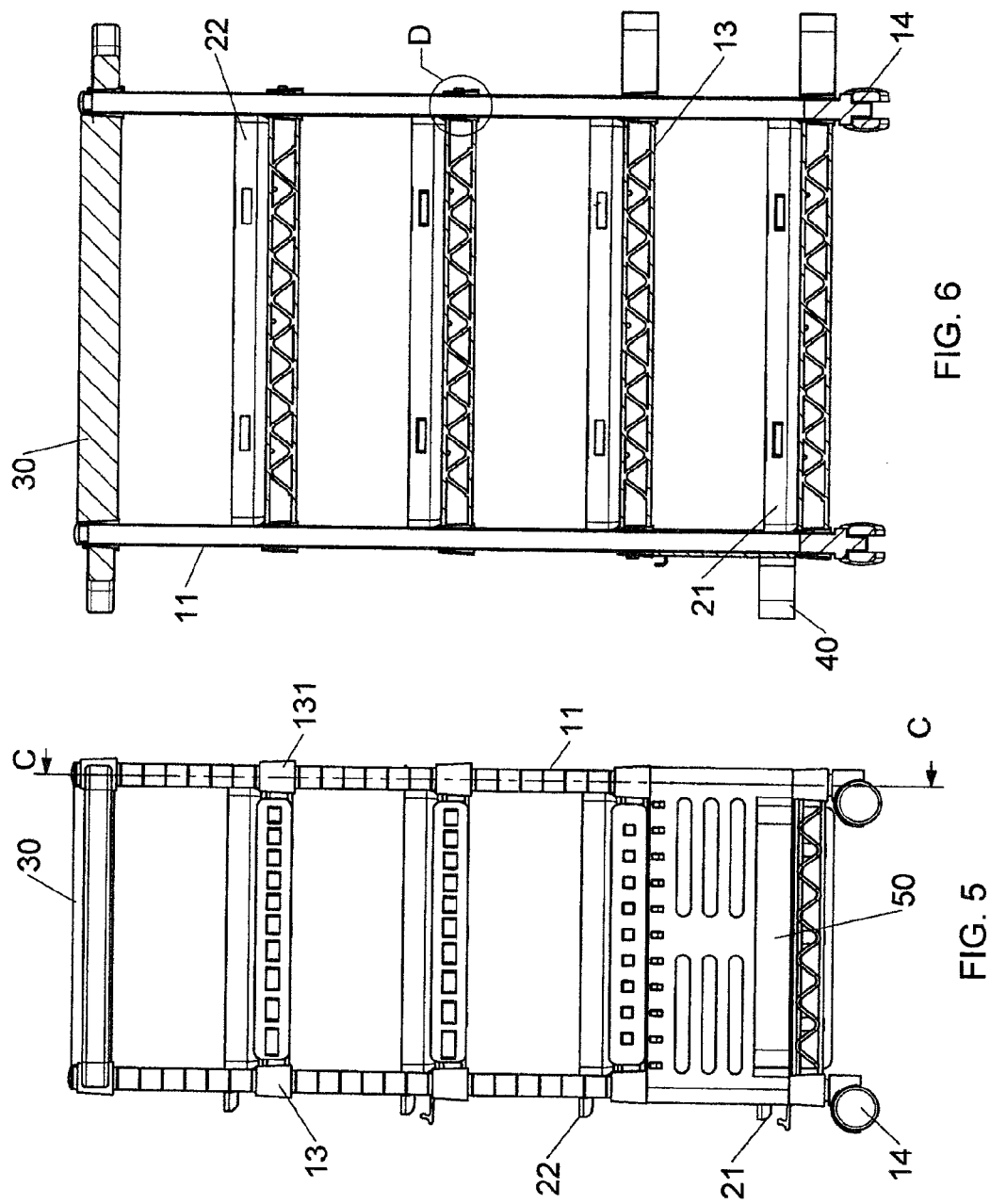

DETACHABLE TOOL CART

FIELD OF THE INVENTION

The present invention relates to a tool cart, particularly to a tool cart whose main frame and toolboxes are detachable for enhancing the convenience of its application, storage, and carrying.

BACKGROUND OF THE INVENTION

According to the prior art of a tool cart disclosed in U.S. Pat. No. 7,699,413, the tool cart is designed as a big box with wheels at its bottom corners. There is a plurality of drawers defined in the tool cart, and the tool cart has a top cover with an extra storage space for hand tools or parts to be placed. The advantages of the tool cart are its sufficient space allowing tools or parts to be stored or hanged and its convenience for being moved, but there are still certain disadvantages from the prior art:

1. The tool cart is unable to be detached and it takes up a lot of space. Therefore, its convenience of usage is limited.
2. The tool cart is unable to be detached and, therefore, its side tray or drawer can not be carried out by itself.
3. The tool cart is not detachable and its volume can not be reduced to improve its convenience of carrying.
4. The tool cart is not meshed with open structure for hanging other materials.
5. The side trays or drawers on the tool cart are not detachable for the tool cart to be functioned as a regular rack.
6. The storage space of the tool cart is not able to be expanded.

SUMMARY OF THE INVENTION

The object of the present invention is to provide a detachable tool cart and to enhance its convenience in accordance with users' needs.

In order to achieve the foregoing object, the tool cart comprises a main frame, at least a toolbox and at least a handle. The main frame includes at least three poles standing in parallel and a plurality of wire plates. Each pole has a wheel jointed at its bottom end, and each wire plate has a plurality of rings designated around to be locked upon corresponding poles at fixed position. A position assembly is applied to fix a ring on the pole. The toolbox includes two polygonal box members which are able to be placed on the wire plate with trays defined inside for placing tools or parts and being. The handle has two sleeves to clasp onto corresponding poles.

BRIEF DESCRIPTION OF THE DRAWINGS

FIG. 1 is an exploded perspective view of the present invention;
FIG. 2 is an enlarged view of circle A taken from FIG. 1;
FIG. 3 is an enlarged view of circle B taken from FIG. 1;
FIG. 5 is a side view of the present invention;
FIG. 6 is a cross-sectional view taken along plane C-C in FIG. 5;
FIG. 7 is an enlarged view of circle D taken from FIG. 6.

DETAILED DESCRIPTION OF THE PREFERRED EMBODIMENT

Figure 4:
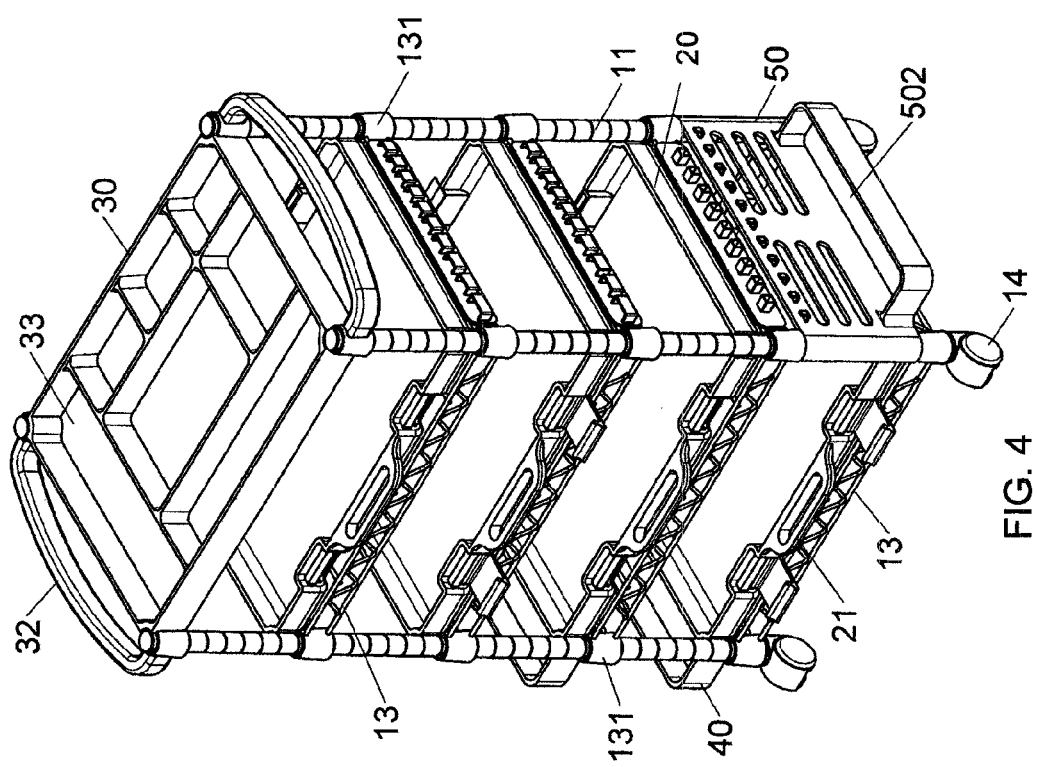
FIG. 4 is an assembled perspective view of the present invention.
Figure 8:
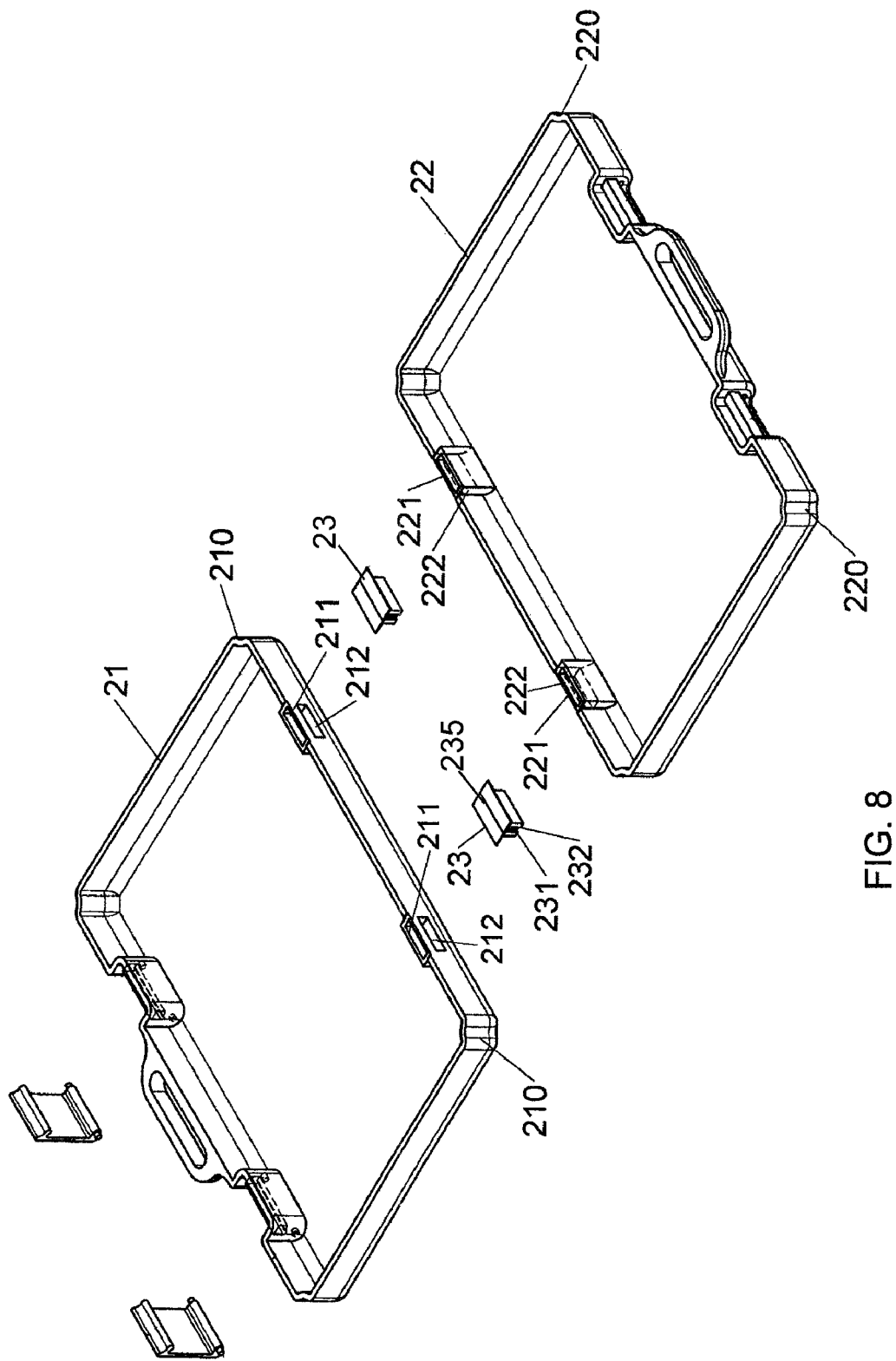
FIG. 8 is an exploded view of the toolbox in accordance with the present invention.
Figure 11:
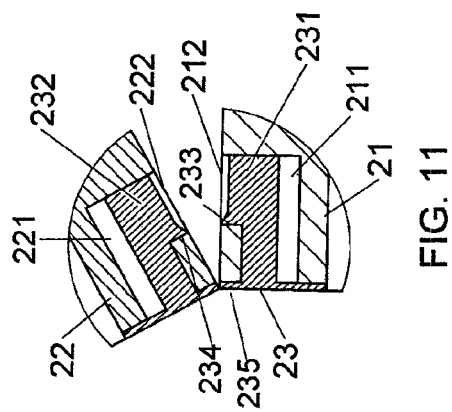
FIG. 11 is an enlarged view of circle F taken from FIG. 10.
Figure 10:
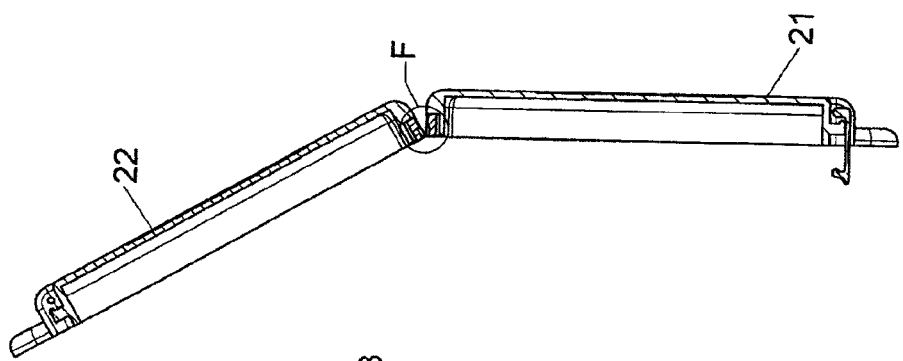
FIG. 10 is a cross sectional view taken along plane E-E in FIG. 9.
Figure 9:
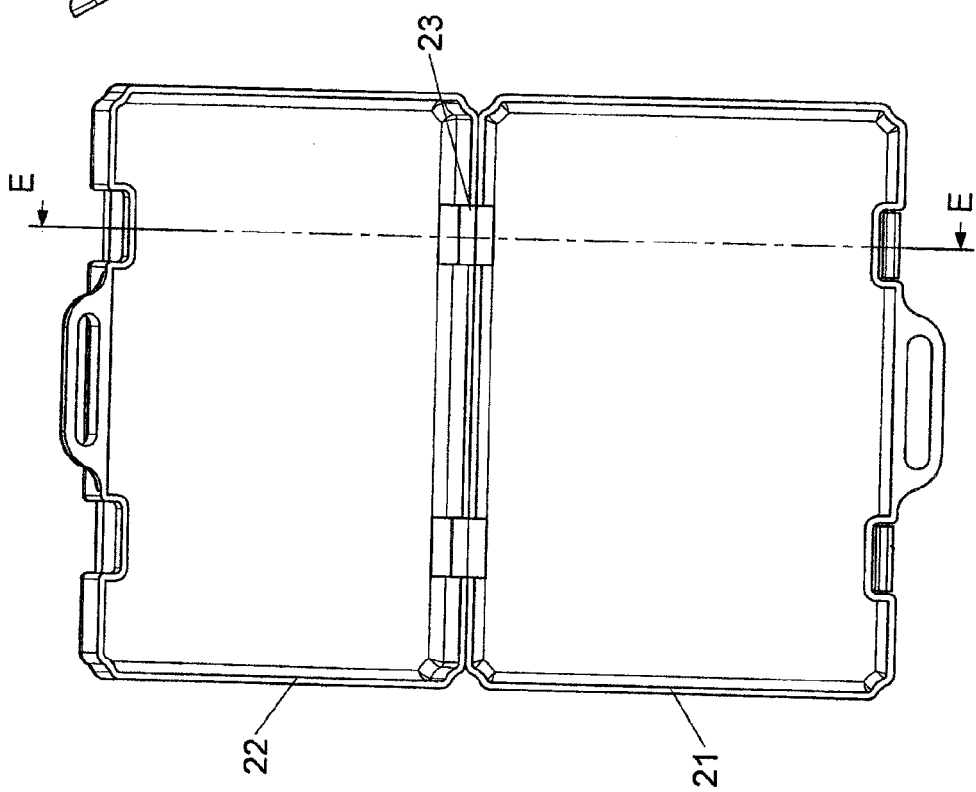
FIG. 9 is an assembled view of the toolbox in accordance with the present invention.

Referring to FIGS. 1 to 3, the tool cart of the present invention comprises a main frame 10, at least a toolbox 20 and at least a handle 32. The mechanism of the cart is detailed as below:

a main frame 10 including a plurality of poles 11 standing in parallel and a plurality of wire plates 13, the quantity of both the plurality of poles 11 and the wire plate 13 being four shown in the embodiment, each wire plate 13 being meshed and having rims 132 raised at its edge, each rim 132 allowing at least a rack 40 to clasp on the wire plate 13 by a hook 41, the rack 40 having notched recesses 401 or upright flanges 402 in pairs or holders 403 for hand tools to be placed, each pole 11 being a tube with a seal 15 capped on its top and having a wheel 14 jointed at the bottom, each wire plate 13 having a plurality of rings 131 designated around to be locked upon corresponding poles 11 at fixed position, a position assembly 12 being applied to fix a ring 131 on the pole 11, two adjacent poles 11 allowing a receptive member 50 to clasp on them by two receptive hooks 51, and the receptive member 50 having a receptacle 502 and receptive openings 501 for tools or parts to be temporarily placed;

a toolbox 20 including two polygonal box members 21/22 capable of folding up towards each other, the box members 21/22 shown in the embodiment being quadrilateral with trays 213/223 defined thereon for placing tools or parts and being able to be placed on the wire plate 13; and a handle 32 having two sleeves 31, an inner wall of each sleeve 31 being same shape with the ring 131 so as to clasp onto the poles 11 (comparing the sleeve 31 and the ring 131 shown in FIG. 1).

Referring to FIGS. 1, 2 and 4 to 7, the position assembly 12 includes a pair of position pieces 120 which are arched. There is a plurality of annular grooves 111 laterally allocated along the periphery of the pole 11 with equal distance, and the arched position pieces 120 are applied on at least one annular groove 111. The outer periphery of a position piece 120 has a laterally slanted tapered arc surface 122. The inner periphery of a position piece 120 has annular flanges 121 to lodge in the annular grooves 111. While the pair of position pieces 120 are applied to clasp onto the outer periphery of the pole 11, the ring 131 is applied to hoop the same pole 11 relative to the pair of position pieces 120. Inasmuch as the tapered arc surfaces 122 are firmly against the inner wall of the ring 131, the ring 131 is fixed on the pole 11.

Referring to FIGS. 8 to 11, there is a plurality of re-entrants 210/220 allocated around the two box members 21/22 of the toolbox 20, and each re-entrant 210/220 is applied to lock against a relative pole 11. The two box members 21/22 of the toolbox 20 are divided, they rotatably connect each other by two joint assemblies. The two box members 21/22 respectively have two lump troughs 211/221 defined separately, and each lump trough 211/221 has a wedge trough 212/222 penetrated from a wall of the lump trough 211/221. Each joint assembly 23 includes two lumps 231/232 and two wedges 233/234, and each lump 231/232 has one wedge 233/234 raised on its side. The two lumps 231/232 of each joint assembly 23 are linked with each other by a foldable joint piece 235, whose middle has minimized thickness in order to make itself easy to fold, and they are respectively arranged in parallel and linearly extended. The two lumps 231/232 are respectively inserted into the lump troughs 211/221 of the box members 21/22, and the two wedges 233/234 are inserted into the wedge troughs 212/222. Therefore, the two box members 21/22 are capable of revolving against each other. On the other hand, users can push the lump 231/232 from the wedge trough 212/222 for the wedge 233/234 to be withdrawn from the wedge trough 212/222 and the lump 231/232 to be withdrawn from the lump trough 211/221. Therefore, the two box members 21/22 can be detached.

Figure 12:
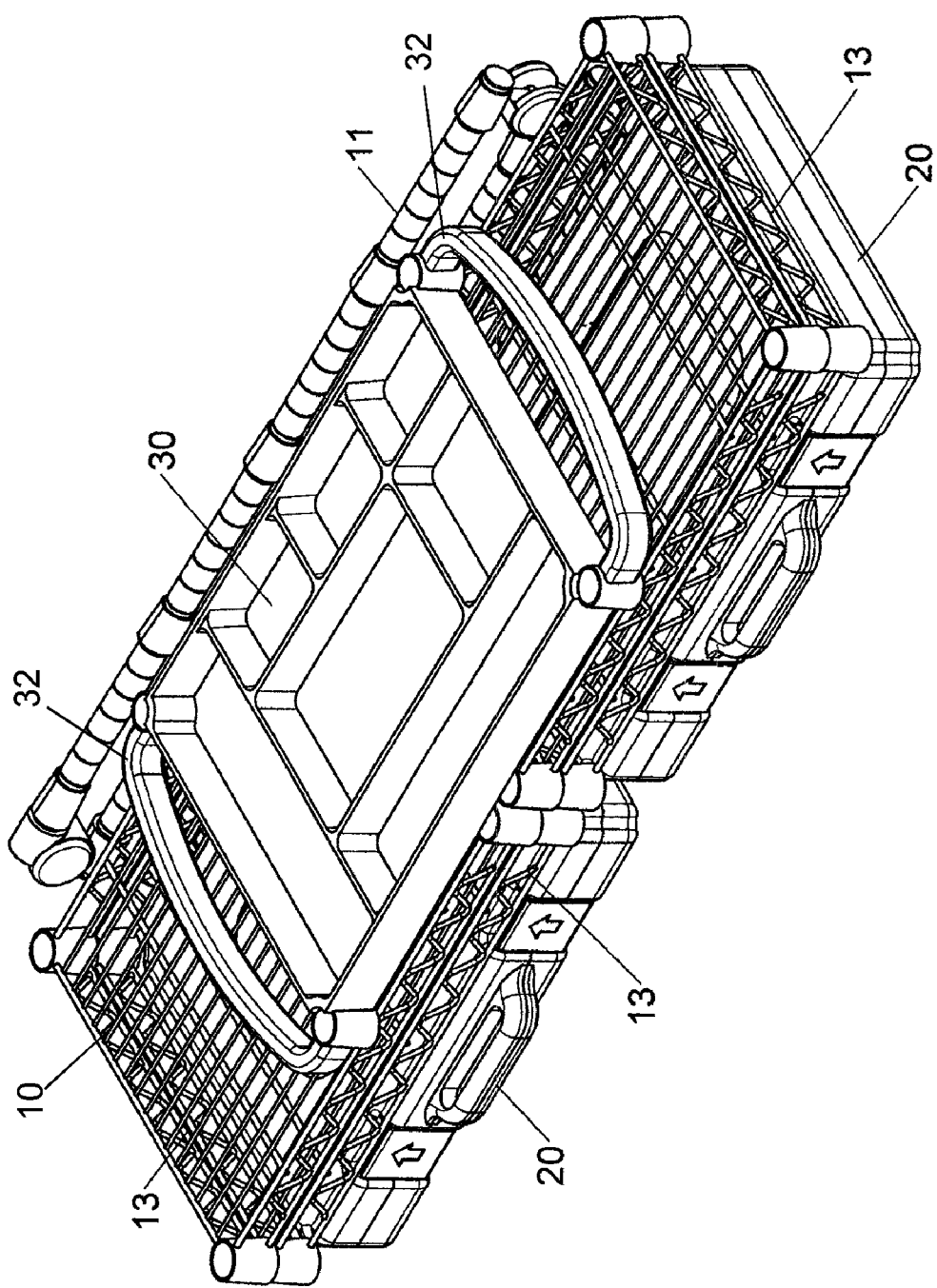
FIG. 12 is a perspective view of a detached and piled tool cart in accordance with the present invention.

The tool cart of the present invention comprising a main frame, toolboxes and handles is detachable. When users do not need to use the cart, it can be detached as shown in FIG. 12 in order to reduce the space for storage and improve the convenience for users to carry.

Figure 13:
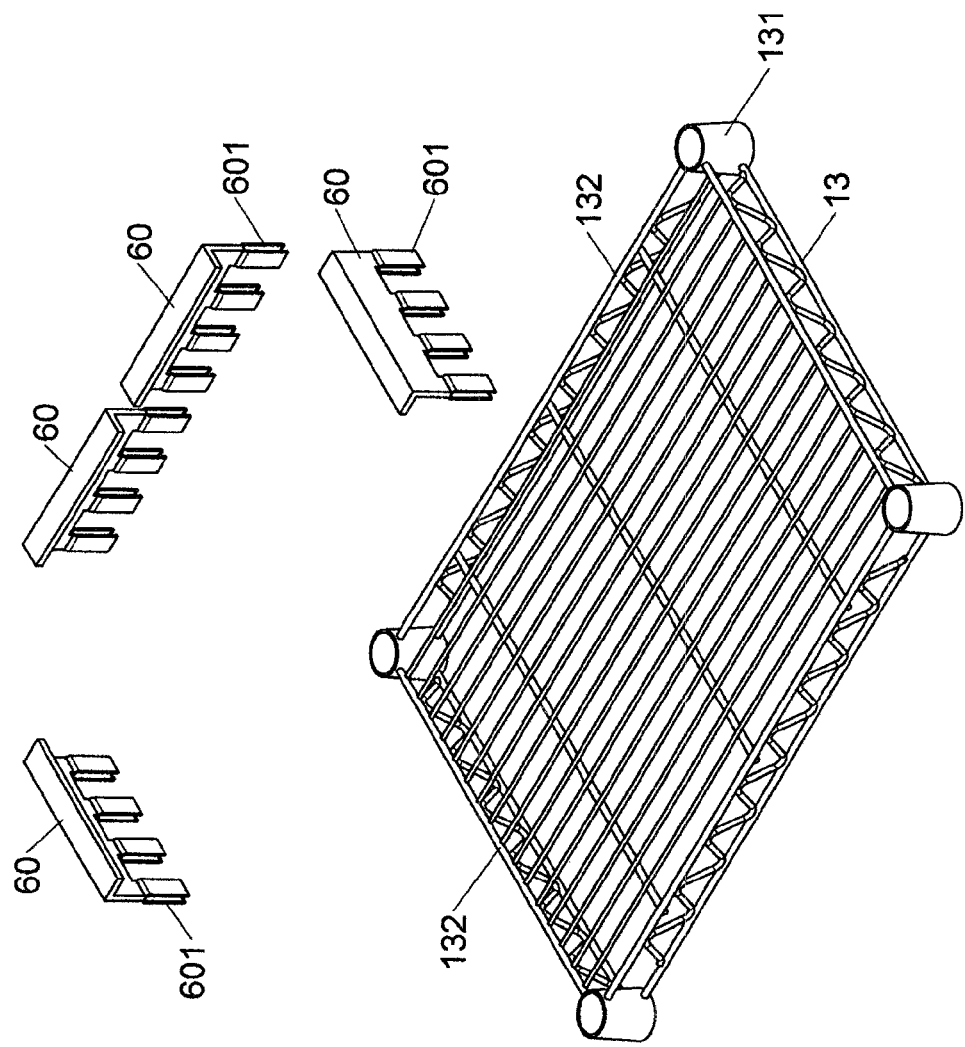
FIG. 13 is an exploded view of the spacing ledges and the wire plate of the second embodiment in accordance with the present invention.
Figure 14:
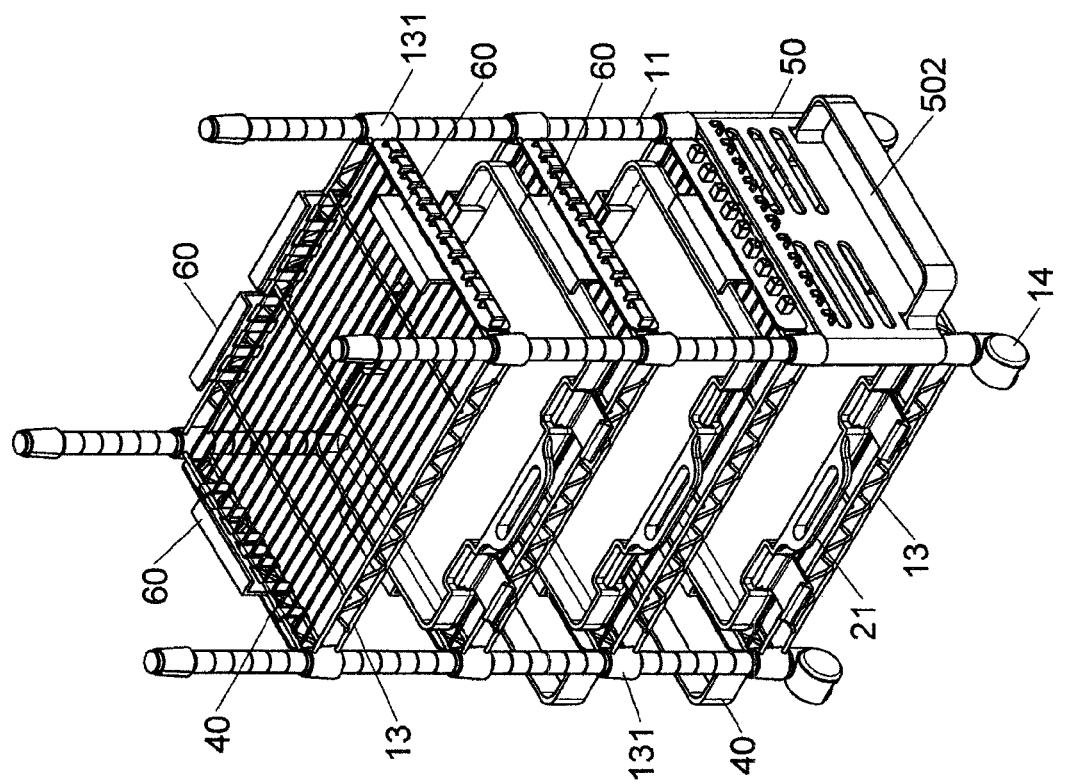
FIG. 14 is an assembled perspective view of the second embodiment in accordance with the present invention.

Referring to FIGS. 13 and 14, there is a plurality of spacing ledges 60 fixed on each wire plate 13 and each spacing ledge 60 holds the outer peripheries of the box members 21/22 for them to be firmly positioned on the wire plate 13. One end of each spacing ledge 60 has first clips 601 to clasp on the rim 132 of the wire plate 13, and the other end holds the side of the box member 21/22 to position the box member 21/22 on the wire plate 13.

Figure 15:
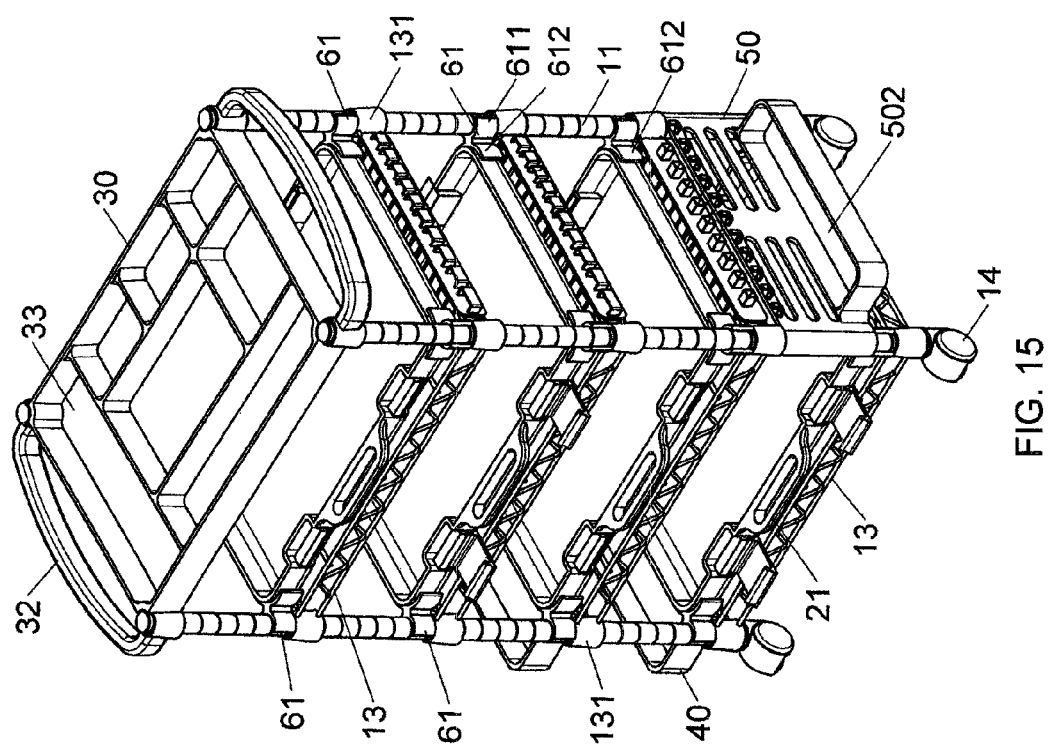
FIG. 15 is an assembled perspective view of the third embodiment in accordance with the present invention.

Referring to FIG. 15, the box members 21/22 are polygonal and between each of their corners and the corresponding pole 11 is a holding block 61. The two opposite ends of the holding block 61 have a notch 611/612 defined respectively. The notch 612 clasps on the outer periphery of the pole 11 and the notch 611 holds the corner of the box member 21/22 to position the box member 21/22 on the wire plate 13.

Figure 16:
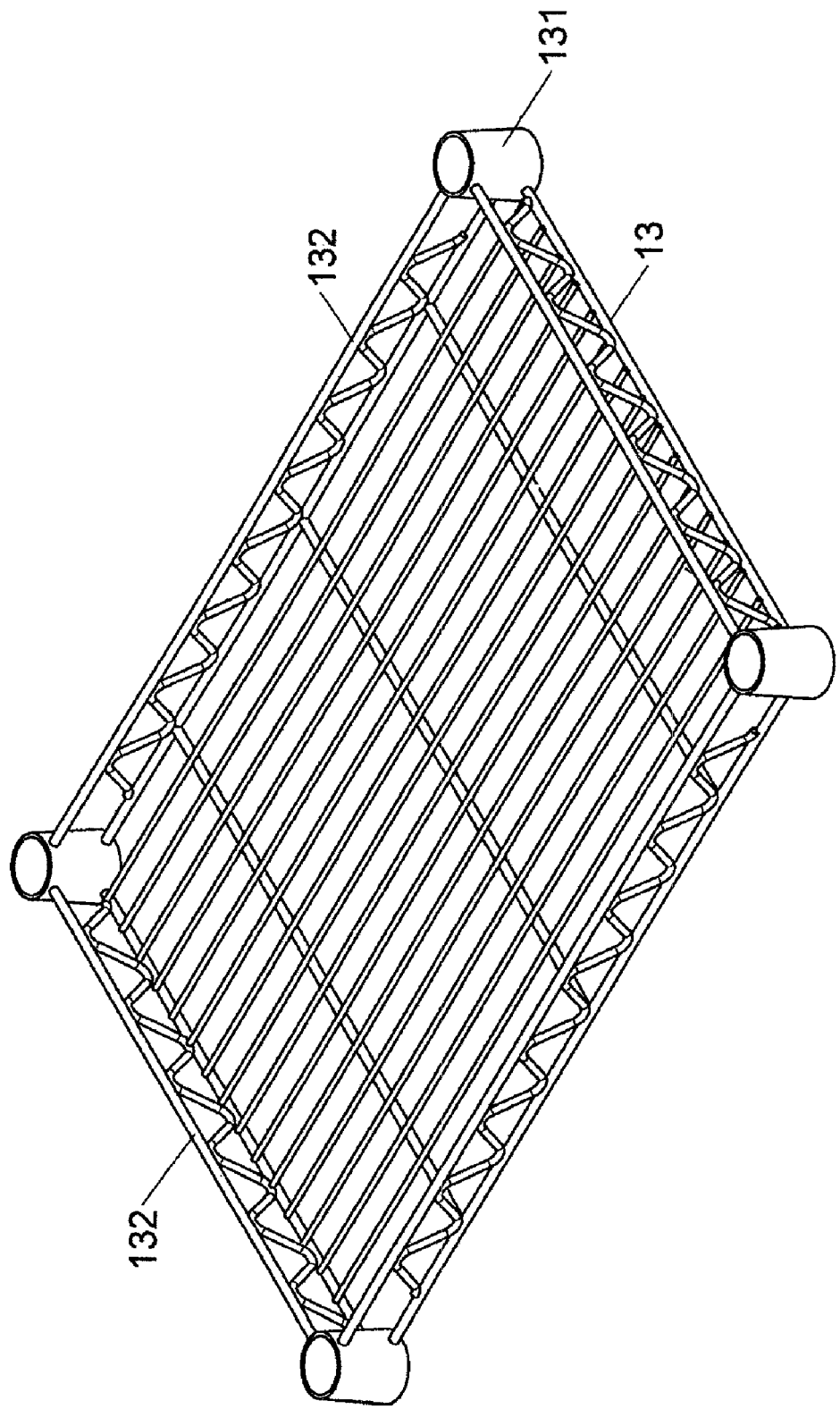
FIG. 16 is a perspective view of the wire plate of the fourth embodiment in accordance with the present invention.

Referring to FIG. 16, the wire plate 13 is designed as a sunken basket for the box members 21/22 to position within.

Figure 17:
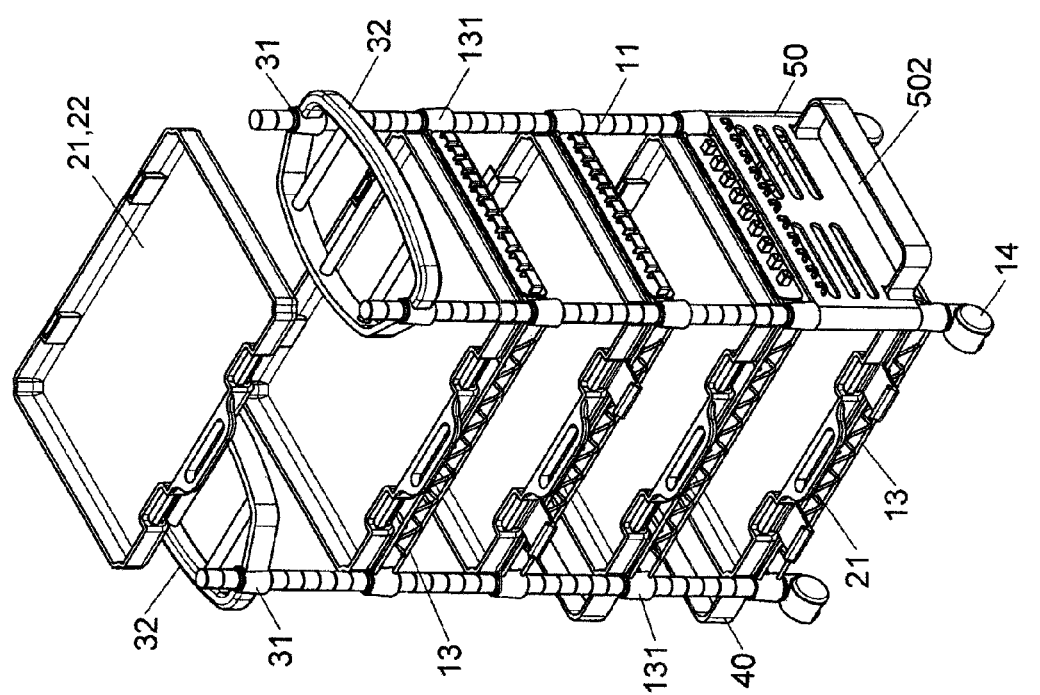
FIG. 17 is a perspective view of the fifth embodiment in accordance with the present invention.

Referring to FIG. 17, there are two handles 32. Each handle 32 has a pair of sleeves 31 to lock onto the poles 11 respectively, and the two handles 32 allow a box member 21/22 to be placed.

Figure 18:
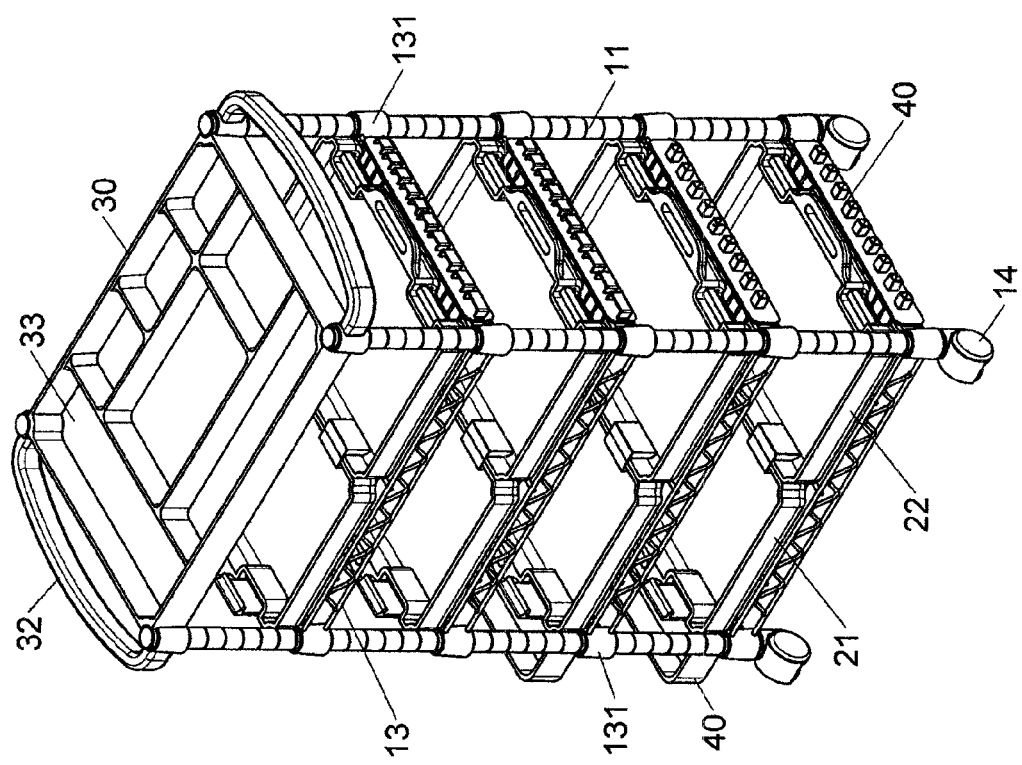
FIG. 18 is an assembled perspective view of the sixth embodiment in accordance with the present invention.

Referring to FIG. 18, the wire plate 13 allows an extended toolbox 20, which comprises two box members 21/22 extended against each other, to place on its top. Furthermore, each handle 32 is positioned between two poles 11 and has a pair of sleeves 31 to clasps onto the two poles 11 respectively, and the two handles 32 are integrally formed with a box 30 which comprises partitioned receptacles 33.

Figure 19:
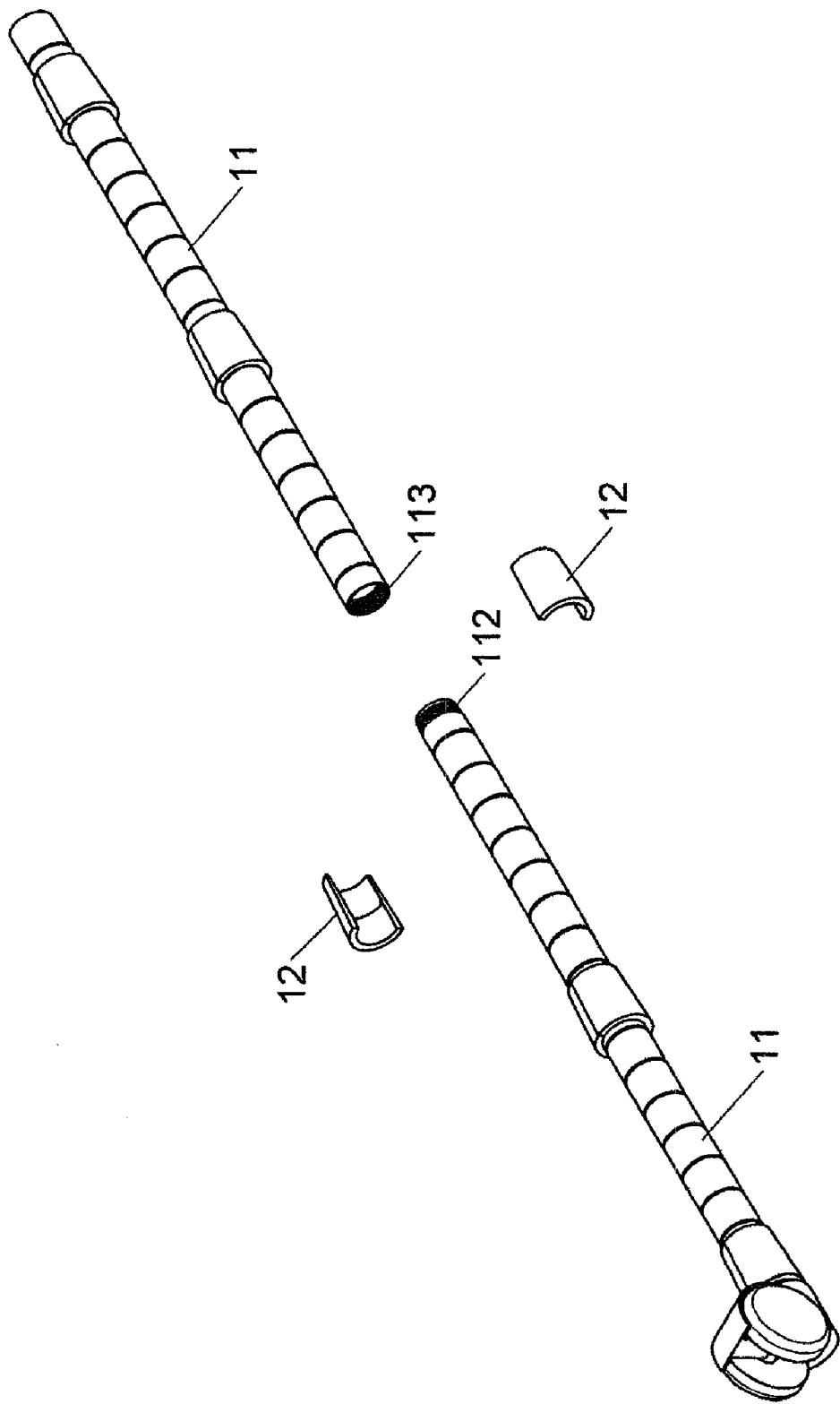
FIG. 19 is an exploded perspective view of the poles of the seventh embodiment in accordance with the present invention.

Referring to FIG. 19, there are one threaded portion 112 and one threaded hole 113 defined at two ends of each pole 11 for two poles 11 jointing together and to elongate the height.

Figure 20:
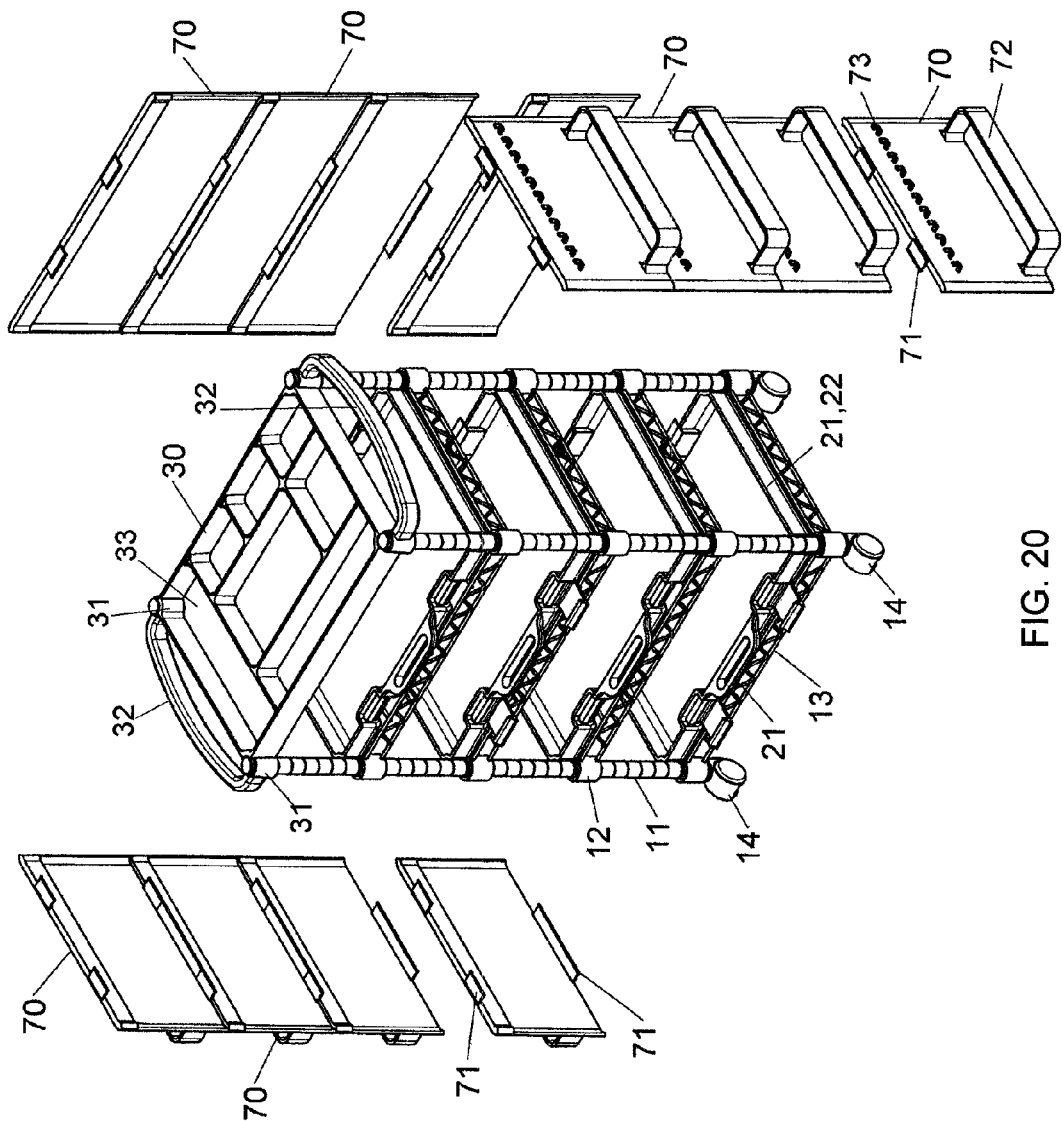
FIG. 20 is an exploded perspective view of the eighth embodiment in accordance with the present invention.
Figure 21:
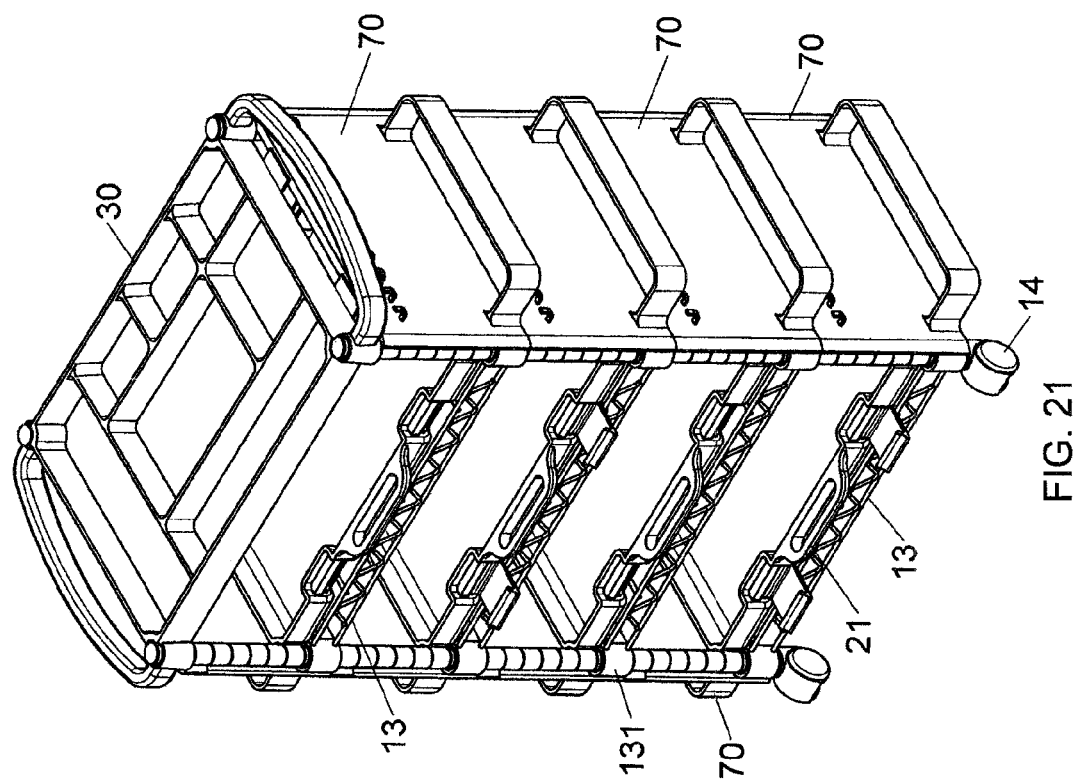
FIG. 21 is an assembled perspective view of the eighth embodiment in accordance with the present invention.
Figure 22:
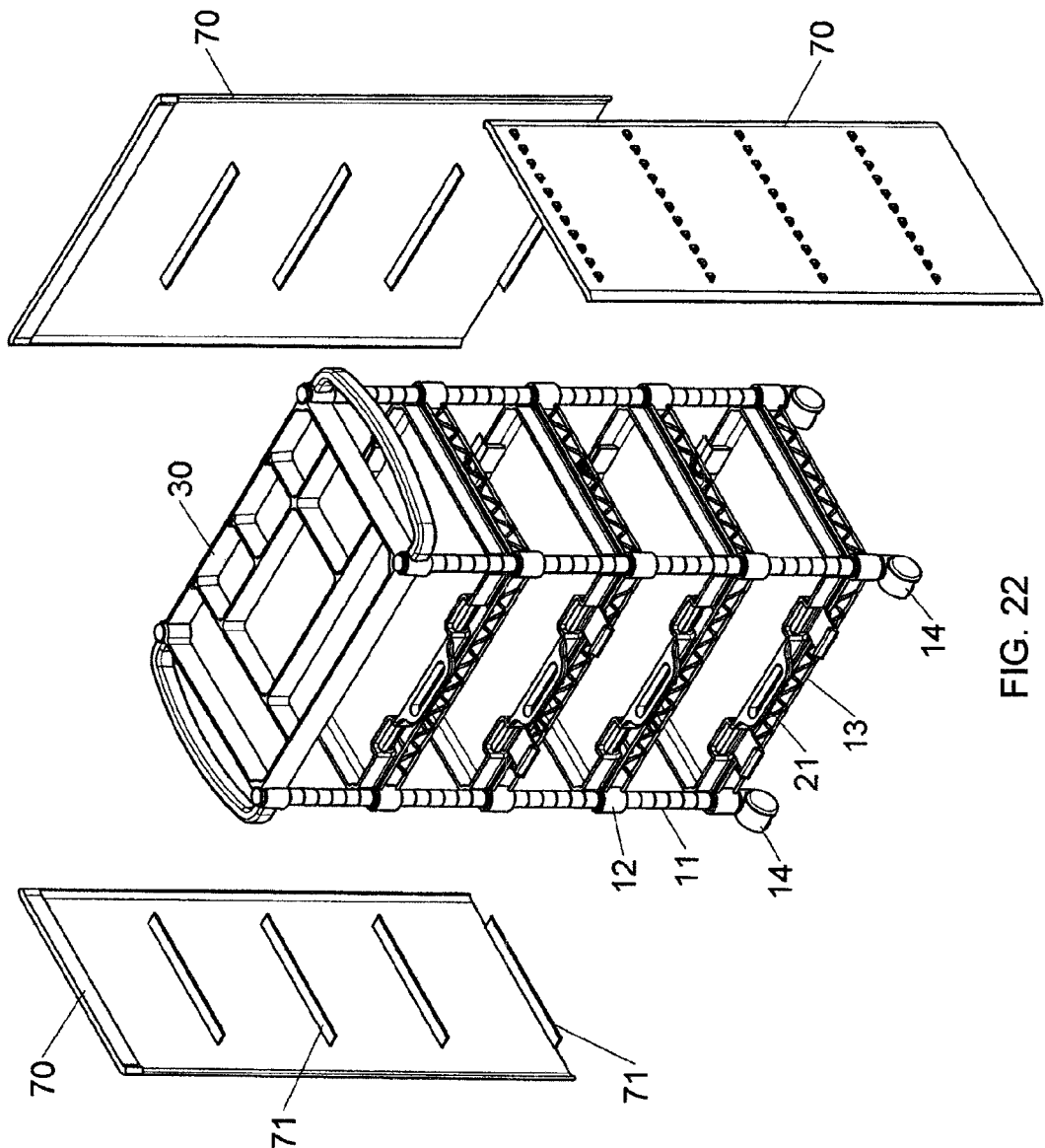
FIG. 22 is an exploded perspective view of the ninth embodiment in accordance with the present invention.
Figure 23:
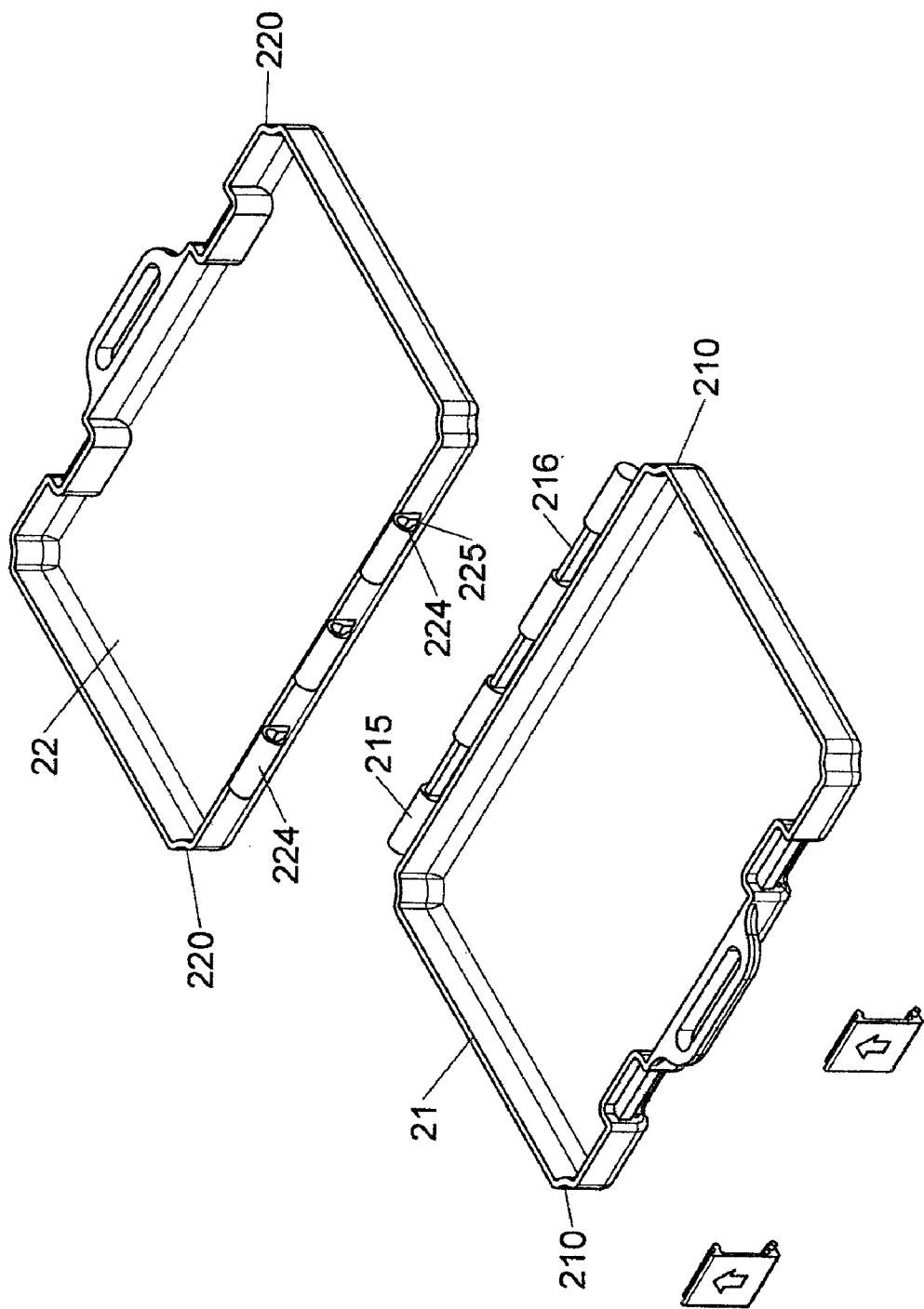
FIG. 23 is an exploded perspective view of the toolbox of the tenth embodiment in accordance with the present invention.
Figure 26:
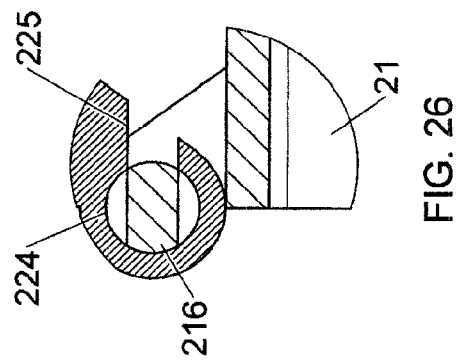
FIG. 26 is an enlarged view of circle F taken from FIG. 25.
Figure 25:
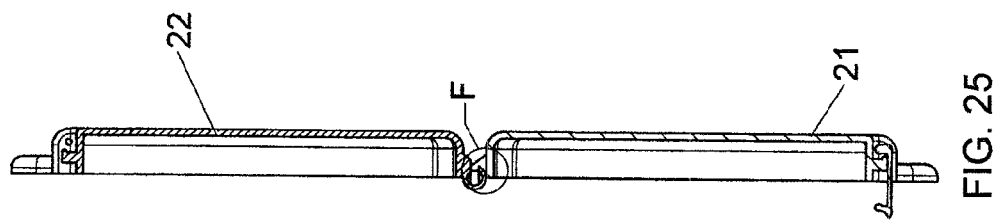
FIG. 25 is a cross-sectional view taken along plane E-E in FIG. 24.
Figure 24:
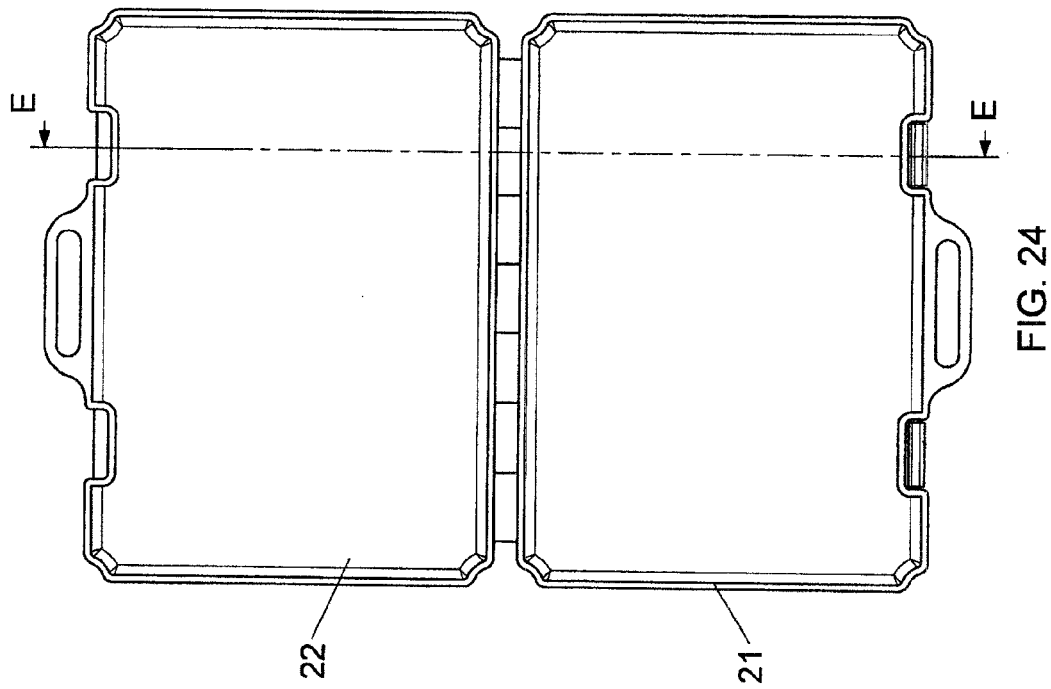
FIG. 24 is an assembled front view of the toolbox of the tenth embodiment in accordance with the present invention.

Referring to FIGS. 20 and 21, there are rims 132 raised around the wire plate 13 and at least one side of the wire plate 13 has a cover plate 70 attached. One side of the cover plate 70 has at least one side tray 72 and at least one side hook 73, and the other side has at least one clamp 71 to clasp on the rim 132 of the wire plate 13. Shown as FIG. 22, the cover plates 70 are elongated.

Referring to FIGS. 23 to 26, one side of the box member 21 has a plurality of raised portions 215 and between every two raised portions 215 is a flat joint rod 216 whose outer diameter is smaller than the width of the raised portion 215. One side of the other box member 22 has a plurality of joint sleeves 224 whose two ends are openings 225 with c-shaped cross section. Inasmuch as the openings 225 allow joint rods 216 to lodge inwards the joint sleeves 224, the two box members 21/22 are jointed together by the joint sleeves 224 and the joint rods 216.

The advantages of the present invention are summarized as bellow:

1. The poles 11, the wire plates 13 and the toolboxes 20 of the main frame 10 can be detached easily to improve the usage of the tool cart in terms of convenience.

2. The main frame 10 and the toolbox 20 are respectively detachable, so the toolbox 20 can be carried out by itself.

3. Both the main frame 10 and the toolbox 20 are detachable and they can be piled up for easier carrying.

4. The main frame 10 is layered, and the wire plates 13 are capable of hanging other things around them. The tool cart has multi-function designs.

5. The toolbox 20 can be detached from the main frame 10, and the main frame 10 can be functioned as a regular rack.

6. The poles 11 can be jointed together to elongate the height for more layers of the wire plates 13 to be added. The tool cart is capable of expanding its capacity.

While we have shown and described the embodiment in accordance with the present invention, it should be clear to those skilled in the art that further embodiments may be made without departing from the scope of the present invention.

What is claimed is:

1. A tool cart comprising:
 a main frame including a plurality of poles standing in parallel and a plurality of wire plates, each wire plate having a plurality of rings designated around to be locked upon corresponding poles at a fixed position, each ring being fixed on the pole by a position assembly; the position assembly comprising a pair of arched position pieces, there being a plurality of annular grooves laterally allocated along a periphery of each pole, each arched position pieces having an outer periphery opposite to an inner periphery, the outer periphery of the position piece having a laterally slanted tapered arc surface, the inner periphery of the position piece having an annular flange, the annular flange being lodged in the annular groove, the ring being applied to hoop the pair of position pieces while the position pieces being applied to clasp onto an outer periphery of the pole, and the ring being fixed on the pole inasmuch as the tapered arc surfaces being firmly against the inner wall of the ring;

at least a toolbox including two box members which are able to be placed on the wire plate with trays defined thereon for placing tools or parts; and at least a handle having two sleeves, an inner wall of each sleeve being same shape with the ring so as to clasp onto the poles.

2. The tool cart as claimed in claim 1, wherein there are two handles, a plurality of toolboxes and four poles, each handle is positioned between two poles and clasps onto the two poles by the sleeve respectively, and the two handles allow one toolbox to be placed.

3. The tool cart as claimed in claim 1, wherein there are two handles, each handle is positioned between two poles and clasps onto the two poles by the sleeve respectively, and the two handles and a box are formed integrally.

4. The tool cart as claimed in claim 1, wherein the two box members are divided, and they rotatably connect each other by two joint assemblies.

5. The tool cart as claimed in claim 4, wherein each box members has two lump troughs, and a wall of each lump trough is defined a wedge trough thereon; each joint assembly includes two lumps and two wedges, and each lump has a wedge raised on its side; the two lumps of each joint assembly are linked with each other by a foldable joint piece, and the two lumps are respectively arranged in parallel and linearly extended; the two lumps are respectively inserted into the lump troughs of the box members, and the two wedges are inserted into the wedge troughs respectively.

6. The tool cart as claimed in claim 1, wherein the quantity of the plurality of poles is four, the quantity of the plurality of the wire plates is also four, the at least a handle is jointed with a box, and the quantity of the at least a toolbox is two.

* * * * *